United States Patent [19]

Aiken, Jr.

[11] 4,393,463

[45] Jul. 12, 1983

[54] INSERTION OF CHARACTER SET CHANGE CODES IN AN ALTERED TEXT STREAM

[75] Inventor: John A. Aiken, Jr., Round Rock, Tex.

[73] Assignee: International Business Machines Corporation, Armonk, N.Y.

[21] Appl. No.: 208,784

[22] Filed: Nov. 20, 1980

[51] Int. Cl.$^3$ .............................................. G06F 7/00
[52] U.S. Cl. .................................................. 364/900
[58] Field of Search ........................ 364/900 MS File

[56] References Cited

U.S. PATENT DOCUMENTS 4,124,843 11/1978 Bramson et al. ................ 364/900 X
4,202,041 5/1980 Kaplow et al. ...................... 364/900

*Primary Examiner*—Raulfe B. Zache
*Attorney, Agent, or Firm*—Harold E. Meier

[57] ABSTRACT

A word processing system is disclosed in which a text stream is stored for recall and editing. The characters in the text stream can be derived from a number of keyboard character sets but each character must be identified according to its character set to be properly printed or displayed. When the system operator moves, copies or deletes blocks of text the correct keyboard character sets must be maintained. When blocks of text are inserted or deleted the keyboard character sets are determined for the interfacing text blocks. When there is a transition from one keyboard character set to another, a character set change code is inserted to indicate the correct keyboard character set for the immediately following text.

8 Claims, 33 Drawing Figures

INSERTION OF CHARACTER SET CHANGE CODES IN AN ALTERED TEXT STREAM

DESCRIPTION

Cross-Reference to Related Application

U.S. patent application Ser. No. 208,788, filed Nov. 20, 1980, entitled "Keyboard Mismatch Correction", and having John A. Aiken, Jr. and Kenneth O. Shipp, Jr. as inventors.

BACKGROUND OF THE INVENTION

1. Field of the Invention

This invention relates to word processing systems and more particularly to the selection of correct keyboard character sets during block transfer of stored text.

2. Description of Prior Art

Prior art relating to the present invention includes:

(a) The IBM OS/6 system uses an 8-bit extension of the 7-bit magnetic card code, but this does not have enough code points to represent all possible supported graphics. In order to maintain the correct keyboard character set for the input graphics it uses a combination of two techniques. The keyboard number representing the keyboard character set which received the text input is saved in a Document Master Format. This is operator selectable. But, where there is a keyboard character set change within a document a format change is inserted in which each character or a short phrase is imbedded within a 6-byte sequence. The problems with this approach are that the operator must either find and inspect the prior format, or must remember what input keyboard has been active in order to know which key to press for a given graphic. Further, the 6-byte sequences inefficiently utilize the available storage for words and phrases especially in limited areas such as margin text. Should the operator make a change in the keyboard specified by the Document Master Format the printed/displayed text could change since the code points within text had not been translated to reflect the change in the specified keyboard in the master format.

(b) The IBM 5520 system adopted the Multi-Lingual EBCDIC Code Page 256 to be the internal text representation. Each of the characters within this Code Page is self-defining but can be ambiguous with characters in other Code Pages. A serious problem in this regard is that communication between the model 5520 and other devices, such as the OS/6, are made difficult since there is no keyboard character set representation within the data stream.

OBJECTS OF THE INVENTION

It is accordingly an object of the present invention to facilitate the correction of stored text which has been input to a storage medium and will be output at a printer or other display.

It is a further object of this invention to provide an automatic keyboard mismatch correction such that blocks of data can be inserted or deleted from a stored text stream without altering the original keyboard character set for each of the characters in the stored and altered data streams.

SUMMARY OF THE INVENTION

These and other objects and advantages are achieved with the present invention. Briefly, a method and apparatus is disclosed for altering a stored text stream in a word processing system where the text stream is stored and different keyboard character sets can be used within the text stream. The text stream is initially displayed to an operator who provides an operator command to identify a block of selected text to be moved, copied or deleted from the text stream at a selected location. The keyboard character set is determined for the preceding text in the text stream immediately before the identified location and for the following text in the text stream immediately after the identified location. The text stream is then altered by inserting or deleting the block of selected text thereto. Character set change codes are then inserted into the altered text stream between the preceding text and the following text to insure that the characters in the text stream and in the block of selected text are each subject to the corresponding and original keyboard character sets.

BRIEF DESCRIPTION OF THE DRAWINGS

The foregoing and other object, features and advantages of the invention will become apparent from the following, more particular description of the preferred embodiment, as illustrated in the accompanying drawings wherein.

DESCRIPTION OF THE PREFERRED EMBODIMENT

Figure 1:
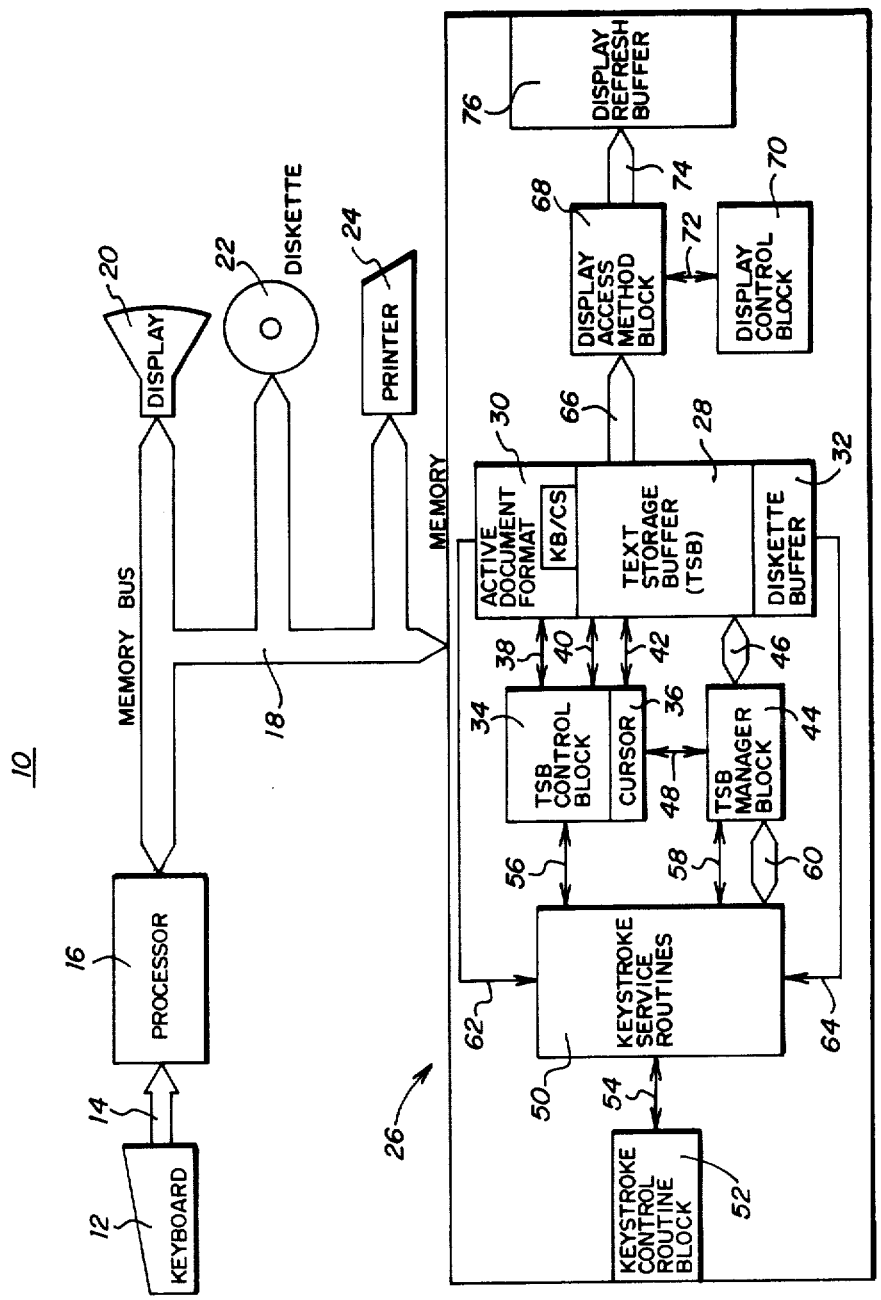
FIG. 1 is a block diagram of the word processing system embodying the present invention.

Referring now to FIG. 1, there is shown a word processing system 10 which includes a keyboard 12 for receiving text and transmitting the text through a channel 14 to a processor 16. A memory bus 18 is connected to the processor 16 as well as to a display 20, such as a CRT, a diskette drive 22, a printer 24 and a memory 26.

An operator enters a text stream through the keyboard 12 and each page of text is stored and processed in the memory 26. As the text stream is received in memory 26, it is also presented on the display 20. After the text has been entered into the keyboard 12 it can be stored on the diskette 22 or printed out on the printer 24.

The memory 26 includes a number of data areas and functional programs for operating with the text stored in the system 10. The text and related control functions are stored in a text storage buffer 28 which includes an active format storage section 30 and a diskette buffer 32. The keyboard character set (KB/CS) for the document in process is stored in the active format section 30.

A text storage buffer control block 34 serves as a data area for the text storage buffer 28. A cursor control section 36 is included within the text storage control block 34. Block 34 is linked through a channel 38 to the active format section 30 and through a channel 40 to the text storage buffer 28. The cursor block 36 is connected through a channel 42 to the text storage buffer 28.

A text storage buffer manager block 44 is coupled to a channel 46 to the next storage buffer 28. Block 44 is further coupled through a channel 48 to the control block 74.

As each character is input through the keyboard 12 it is received at the memory 26 through a collection of keystroke service routines 50. A keystroke control routine block 52 is a data area which determines the selected keystroke routine for processing the received character. Block 52 is linked to the keystroke service routines 50 through a channel 54. The keystroke service routines block 50 is further linked through a channel 56 to the text storage buffer control block 34 and through channel 58 and 60 to the text storage buffer manager block 44.

The active format section 30 of buffer 28 is connected through a channel 62 to the keystroke service routines block 50. The diskette buffer is connected through a channel 64 to the keystroke service routines block 50.

The text characters and control information in text storage buffer 28 are communicated through channel 66 to a display access method block 68 which serves as an interface for the display 20. Corresponding access method blocks for the keyboard 12, diskette 22 and printer 24 are substituted for block 68 when communication with these units is required. A display control block 70 is connected through a channel 72 with the display access method block 68. A control block corresponding to control block 70 is likewise used for the keyboard 12, diskette 22 and printer 24.

The text information from the text storage buffer is further transmitted through a channel 74 to a display refresh buffer 76. The information stored in buffer 76 is the actual information which is shown on the display 20. A buffer is similarly provided for supplying data to the other input and output units including the keyboard 12, diskette 22 and printer 24.

The display control block 70 serves to store flags and status information as required by the operation of the block 68.

The operation of the word processing system 10 is now briefly described in reference to FIG. 1. As the operator enters each keystroke at the keyboard 12 a corresponding signal is transmitted through channel 14 to the processor 16 which enters the keystroke command into the memory 26. Upon receipt of the keystroke command a keystroke routine is produced from block 50 to handle the particular command received. The keystroke command is then processed according to whether it is a control command or a graphic entry, and the result of the keystroke processing is entered into the text storage buffer 28. While graphics and commands are built up in the text storage buffer 28 the text information is retained in the buffer 76 and presented at the display 20.

Through control commands the operator can transfer information between the memory 26, display 20, diskette 22 and printer 24. Selected pages can be called up from the diskette 22 into the memory 26 so that the operator can make changes and corrections to the text and then re-enter the corrected text into the diskette 22 or have the corrected text printed at the printer 24.

Figure 2:
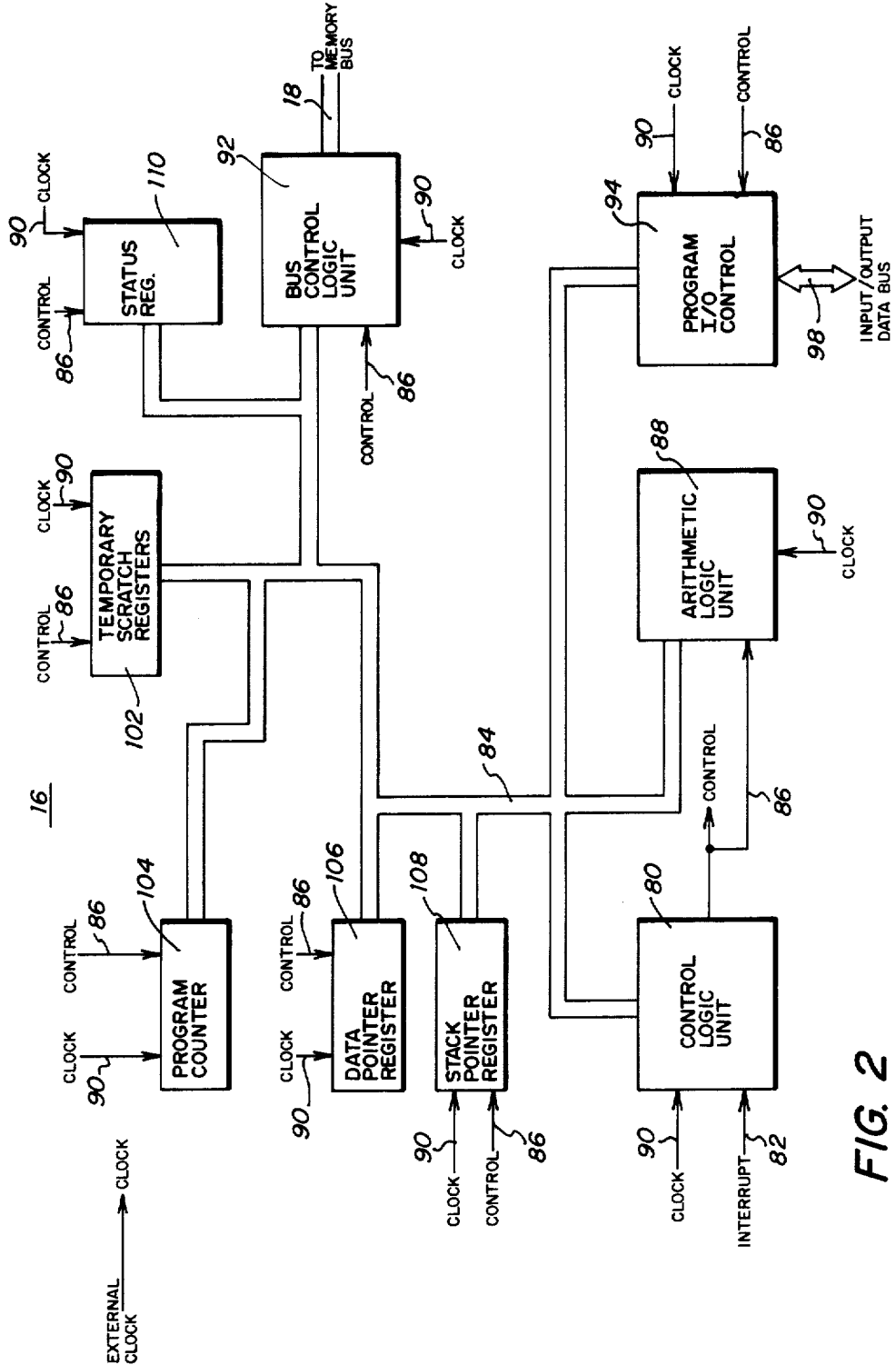
FIG. 2 is a block diagram further defining the processor shown in FIG. 1.

Referring to FIG. 2, the processor 16 is shown in further detail to illustrate typical hardware elements as found in such processors. The processor can be a commercially available unit, such as an Intel Corporation microprocessor identified by the model number 8086.

Such a processor includes a control logic unit 80 which responds to interrupts on a device bus 82 from the keyboard 12. The control logic unit 80 is also connected to a data and address bus 84 which is interconnected to various other logic units of the processor 16.

In response to a fetch instruction from the random access memory 26, the control logic unit 80 generates control signals to other logic elements of the processor. These control signals are interconnected to the various elements by means of a control line 86 which is illustrated directly connected to an arithmetic logic unit 88 and identified as an "control" line 86 to other elements of the processor. Synchronous operation of the control unit 80 with other logic elements of the processor 16 is achieved by means of clock pulses input to the processor from an external clock source. The clock pulses are generated by the external clock source and transmitted through a bus 90 also shown interconnected to most of the other logic elements of the processor detailed in FIG. 2.

Data and instructions to be processed in the processor 16 are input through a bus control logic unit 92. Data to be processed may also come from a program input/output control logic 94. The bus control logic 92 connects storage elements of the random access memory 26 and receives instructions for processing data received from the input/output control 94 or received from the memory 26. Thus, the input/output control 94 receives data from the keyboard 12 or the random access memory 26 while the bus control logic 92 receives instructions and/or data from the same memory. Note, however, that different storage sections of the random access memory are identifiable for instruction storage and data storage.

Device control information from the processor 16 is output through the program input/output controller 94 over an input/output data bus 98. Input data on the data bus 98 from the keyboard 12 is processed internally through the processor by instructions through the bus 84 to the control unit 80 by the arithmetic logic unit 88. The arithmetic logic unit, in response to a control signal on line 86 and in accordance with instructions received on the memory bus 18, performs arithmetic computations which may be stored in temporary scratch registers 102.

Various other transfers of data between the arithmetic logic unit 88 and other logic elements of the processor are of course possible. Such additional transfers may be to a program counter 104, a data point register 106, stack pointer register 108 or a status register 110.

Also connected in the data stream for these various logic elements by means of the bus 84 is a status register 110. The particular operation of the processor is determined by instructions and data on the memory bus 18 and input data on the bi-directional bus 98. As an example, in response to received instructions, the processor transfers data stored in the scratch registers 102 to any one of the registers 106, 108 or 110. Such operations of processors as detailed in FIG. 2 are considered to be well known by one of ordinary skill in the data processing field. A detailed description of each operation of the processor of FIG. 2 for the described invention is not deemed necessary for an understanding of the invention as claimed.

Figure 3A:
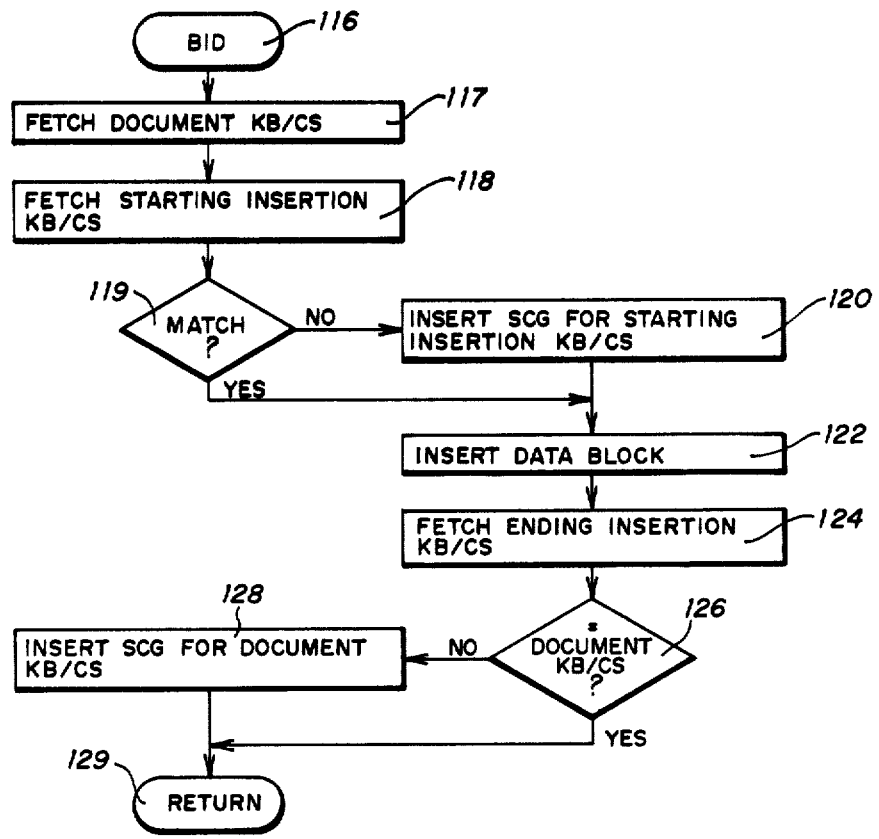
FIGS. 3A and 3B are a flow diagram showing the operational steps of the present invention.
Figure 3B:
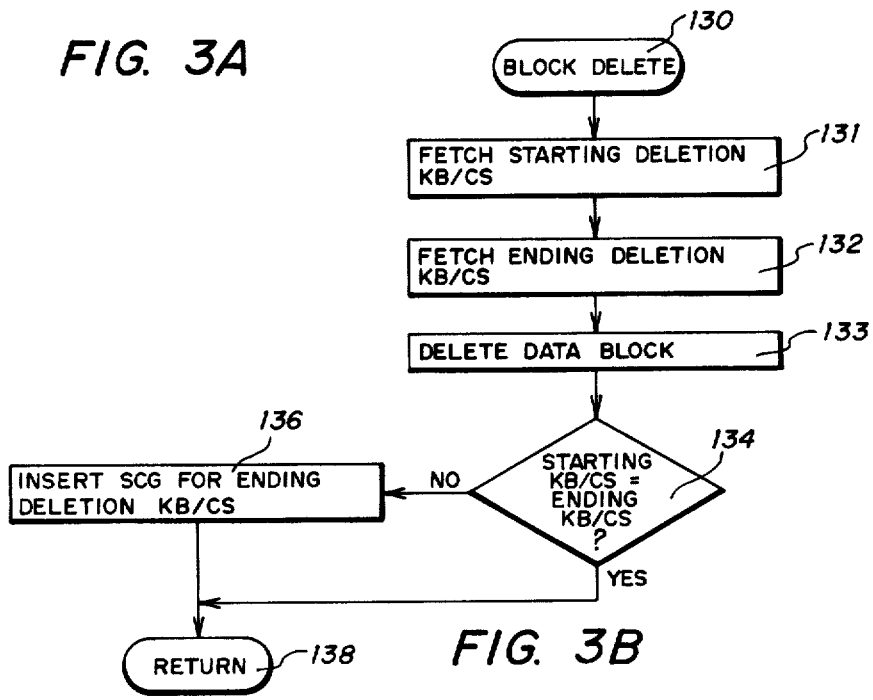

A logical operation of the present invention is illustrated in the flow diagrams shown in FIGS. 3A and 3B. The procedure is started with the block insert data (BID) service routine step 116. In step 117 the keyboard character set for the document in process is determined. This is the keyboard character set for the preceding text immediately before a location designated by the operator for inserting a block of text material with the operator specifying a block of text to be inserted via the keyboard 12 and display 20.

In step 118 the keyboard character set is determined for the starting text of an insertion of text material which will be entered into the document being processed. The keyboard character set for the text preceding the point of insertion in the document and the starting text in the insert are compared in step 119. If the character sets do not match a character set change code (SCG) is inserted between the preceding text of the document and the starting text of the insert. The SCG indicates the keyboard character set for the starting text of the insert.

After insertion of the SCG the data block of text is inserted in step 122.

After the data block is inserted the keyboard character set at the end of the inserted data block is determined. In step 126 the keyboard character set for the text of the document prior to the inserted data block is compared for the keyboard character set for the ending text of the insert. If these two character sets do not compare, another SCG is inserted in the text stream as indicated in step 128. The SCG for the following text of the document is inserted after the insert and before the beginning of the following text. After insertion of this SCG into the text stream the process is returned through step 129 to the start at step 116.

Returning to step 119, if the keyboard character sets for the preceding text of the document and the starting text of the insert match then there is no need for the insertion of an SCG and step 120 is skipped with the operation proceeding directly from step 119 to step 122.

Returning to step 126, if the keyboard character set for the ending text of the insert corresponds to the keyboard character set for the following text of the document then there is no need for an insert and step 128 is skipped and the process proceeds directly from step 126 to step 129.

Referring to FIG. 3B, the deletion procedure is started with step 130 with the operator specifying a block of text to be deleted via the keyboard 12 and display 20. In step 131 the keyboard character set for the text preceding the start of the data block to be deleted is determined. In step 132 the keyboard character set for the text following the end of the data block to be deleted is determined. Once these keyboard character sets have been determined the data block is deleted in step 133.

In step 134 the two keyboard character sets at the start and at the end of the data block are compared. If these two character sets do not compare then a character set change code (SCG) for the text following the deleted data block is inserted immediatly preceding the text following the deleted data block. After insertion of the SCG into the text stream the process is returned through step 138 to the start at step 130.

Returning to step 134 if the two character sets match then there is no need for the insertion of an SCG and step 136 is skipped with the operation proceding directly from step 134 to step 138.

Figure 4:
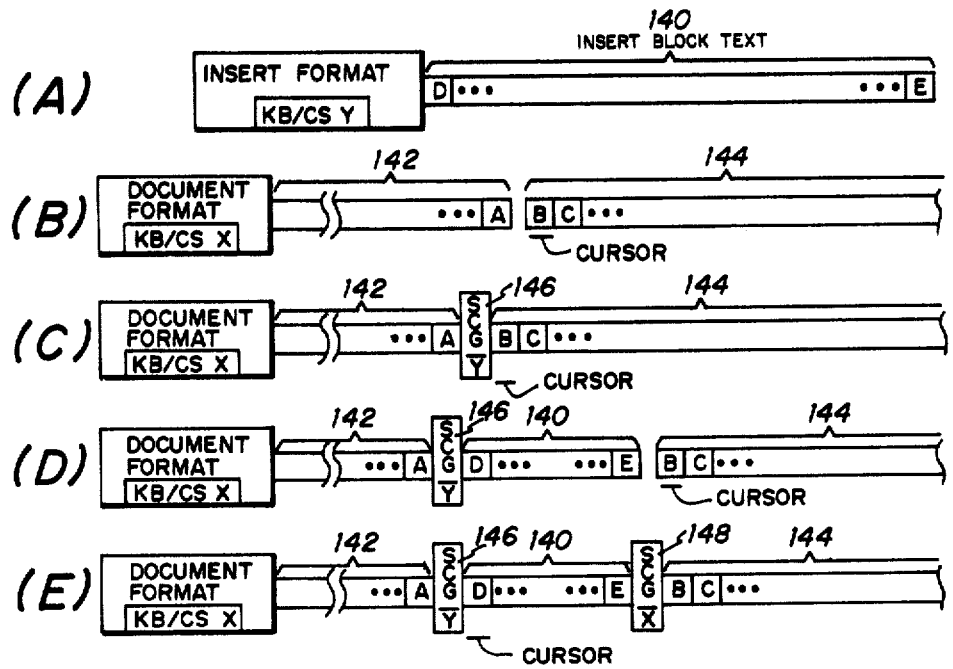
FIGS. 4A-E, 5A-E, 6A-E, 7A-E, 8A-E and 9A-D illustrate examples of the insertion/deletion of block text in a text stream with various combinations of keyboard character sets for the inserted/deleted text and the stored text stream.
Figure 5:
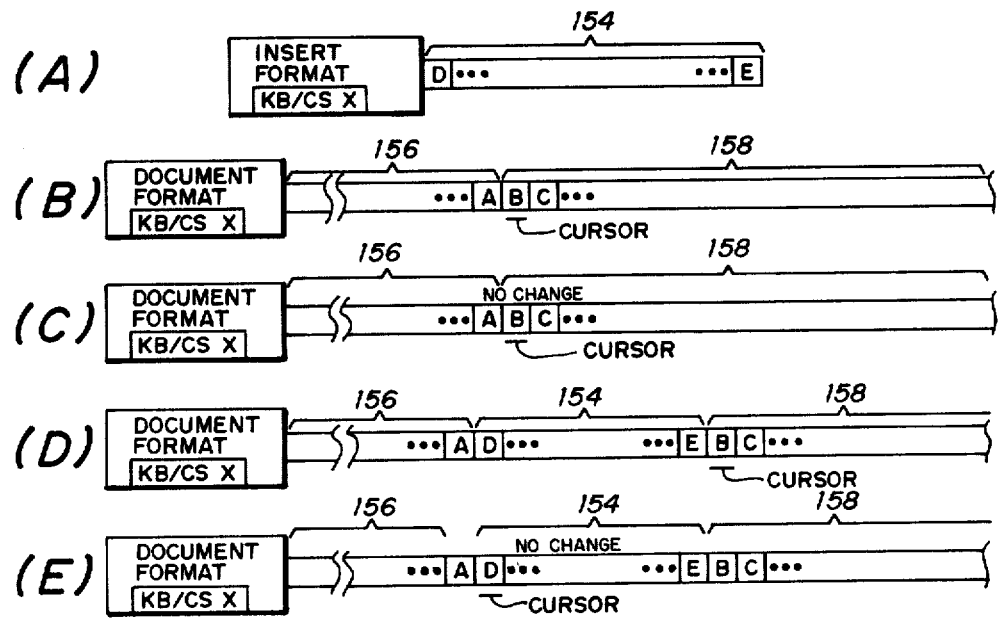
Figure 6:
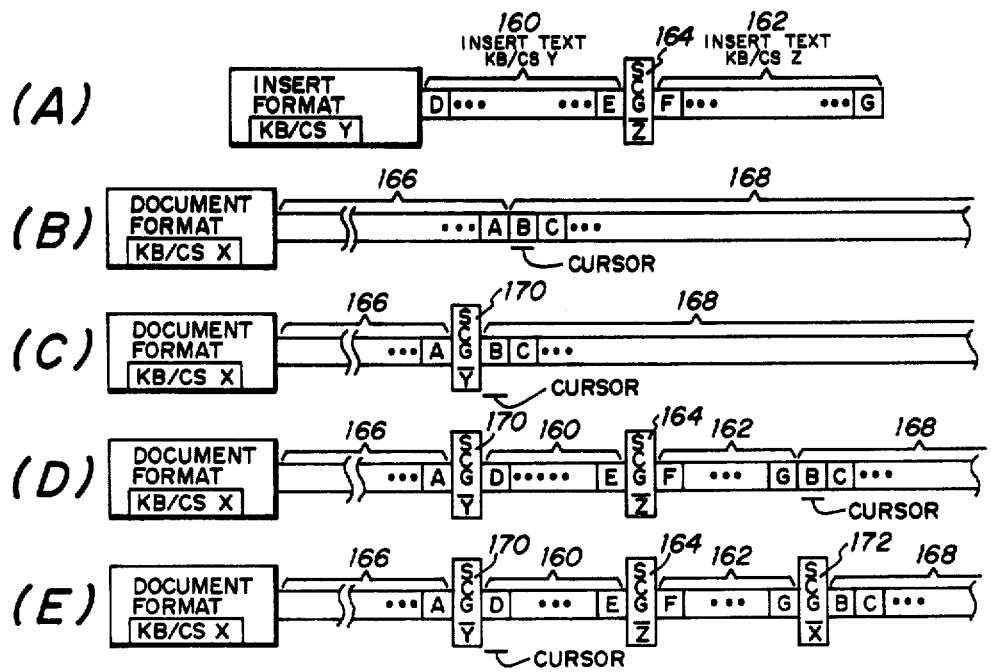
Figure 7:
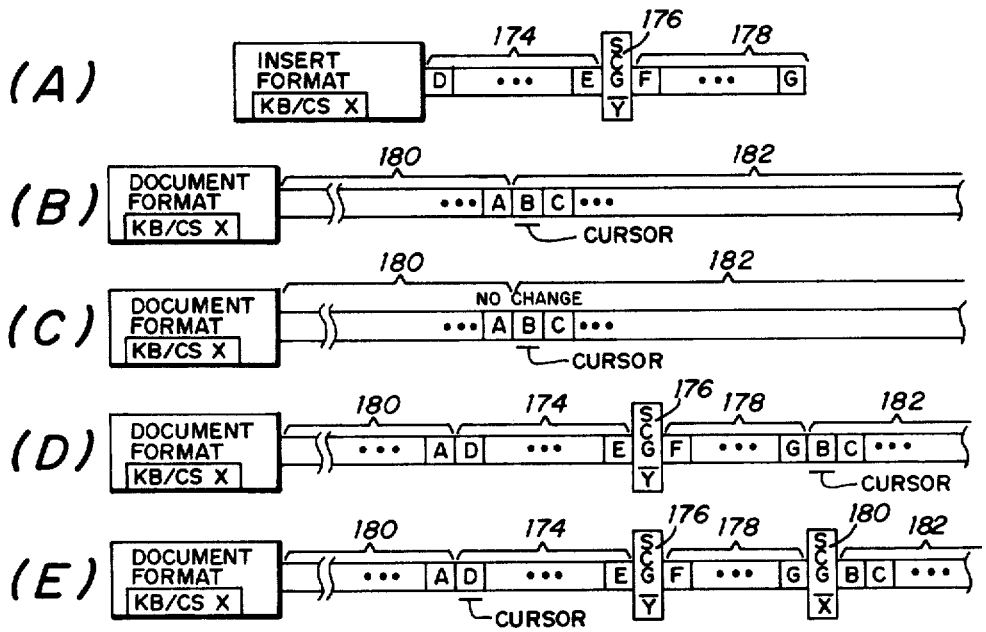
Figure 8:
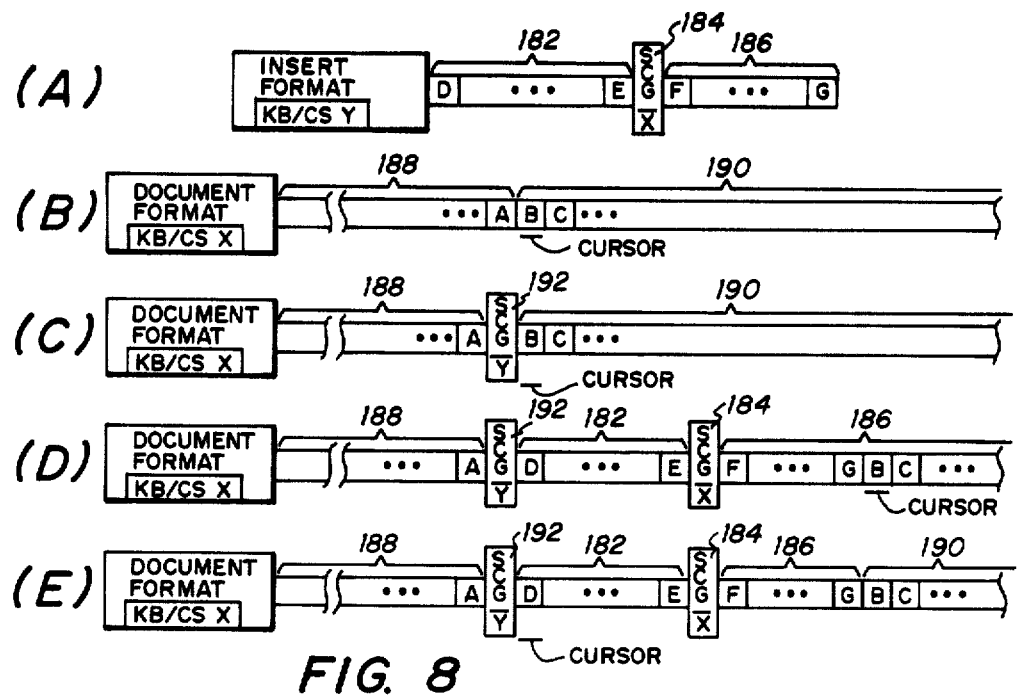

Examples of the procedure of the present invention are illustrated in FIGS. 4–8. Referring now to FIG. 4, an insert block text 140 has a keyboard character set of "Y". As shown in FIG. 4B a cursor is set below character B to indicate that the operator has chosen a location between characters A and B for insertion of block text 140 between document texts 142 and 144. However, the active document keyboard character set for the document in progress is "X".

Referring to FIG. 4C, since the insert text 140 has a different keyboard character set from that of the document, a character set change code must be inserted. This is shown as the character set change code SCGY 146. Note that it is inserted at the end of the preceding text 142 of the document.

Referring now to FIG. 4D, the insert block text 140 in inserted into the character stream following the SCGY 146. Since the insert has the Y character set and the document had the X character set a character set change code SCGX 148 must be inserted at the end of the insert and before the beginning of the following text of the document.

In FIGS. 5A–5E there is illustrated the case where the insert has the same keyboard character set as the document. The insert 154 is to be added in the document text 156, 158 between the characters A and B as indicated by the cursor at character B. Since the character sets are the same, there is no need to insert a character set change code. The insert text 154 is added to the data stream between document texts 156 and 158. Note that further there is no need to add a character set change code at the transition from the ending text of the insert to the following text of the document.

A further example is illustrated in FIGS. 6A–E. The insert comprises a starting text section 160 and an ending text section 162. The starting text section has a keyboard character set of Y and the ending text section has a keyboard character set change code of Z. A character change code 164 changes the character set from Y to Z. The document text is shown as text sections 166 and 168. As indicated by the cursor under the character B the insert is to be placed between the characters A and B.

Referring to FIG. 6C, a character set change code 170 for the character set Y is inserted after the preceding text section 166 since that text section is in character set X and the starting text of the insert is in character set Y. In FIG. 6D, the insert sections 160, 162 and 164 are entered into the document text stream between the characters A and B. Referring to FIG. 6E, an SCG 172 is inserted between the ending text section 162 and the following text section 168 to change to the X character set.

A further example of the method of the present invention is illustrated in FIGS. 7A–E. In FIG. 7A the insert text has starting text section 174, an SCG 176 for the Y set and an ending text section 178. The document text for receiving the insertion is shown in FIG. 7B with the cursor at the location of the B character to indicate that the insert goes between the A and B characters. The document text comprises preceding text section 180 and following text section 182. Since the starting text of the insert is in the X character set and the preceding text of the document text is also in the X set there is no need to insert a character set change code between text sections 180 and 174. This is shown in FIG. 7C. In FIG. 7D the entire text section comprising elements 174, 176 and 178 is inserted in the document text stream. Referring to FIG. 7E an SCG 180 is inserted between the ending text section 178 of the insert and the following text section 182 of the document in order to change from the Y character set to the X character set.

A still further example of the method of the present invention is shown in FIGS. 8A–E. The insert comprises a starting text 182 which is in the Y character set.

A character set change code 184 changes to the X character set for the ending text 186 of the insert. The document text as shown in FIG. 8B has preceding section 188 and following section 190 with the cursor placed under the character B. In FIG. 8C a character set change code 192 is inserted after the preceding text 188 to change from the X to the Y character set. In FIG. 8D the insert elements 182, 184 and 186 are entered into the document text after the character set change code 192.

Referring to FIG. 8E there is no need for an additional character set change code after the ending text 186 and before the following text 190, since both texts are in the X character set.

Figure 9:
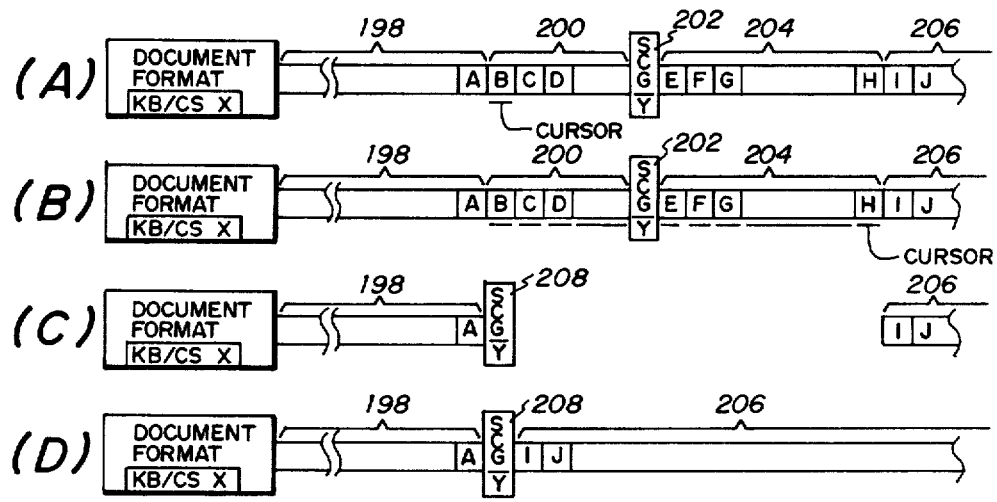

Referring now to FIG. 9, there is illustrated an example of the method of the present invention for the deletion of a block of text from a text stream. The original document text stream is shown in FIG. 9 and comprises text sections 198, 200, a character set change code 202 and text sections 204 and 206. The object of this example is to delete the text section 200 and 204. Note that there is a character set change code within the block of text to be deleted. Should this block of text merely be deleted without compensating for the character set change code in the text, section 206 would have the incorrect keyboard character set. The cursor is initially set to the character B. In FIG. 9B the characters within the deletion block have been highlighted by operation of the cursor.

In FIG. 9C the block sections 200 and 204 have been deleted along with the character code 202. The following text section 206 was examined prior to the deletion of blocks 200, 202 and 204 to determine its character set and if this should differ from the character for the preceding text section 198, character set change code 208 is inserted between these two sections. Since the following text section 206 is in the Y character set, the character code 208 must set the text stream to the Y character set. Referring now to FIG. 9D the text section 206 is moved to be immediately adjacent to the text section 198 and character set change code 208.

In summary the present invention provides a method and apparatus for maintaining the correct keyboard character set in a multi-set environment while permitting the operator to have wide flexibility in editing text.

Although several embodiments of the invention have been illustrated in the accompanying drawings and described in the foregoing detailed description, it will be understood that the invention is not limited to the embodiments disclosed but is capable of numerous rearrangements, modifications and substitutions without departing from the scope of the invention.

What is claimed is:

1. In a text processing system where a text stream is stored and different character sets are selectable for insertion or deletion within the text stream, a method for altering said text stream, comprising the steps of:

displaying said text stream to an operator;
   identifying a block of selected text to be inserted or deleted from said text stream at a selected location, said identification in response to operator commands;
   determining the character set for the preceding text in said text stream immediately before the selected location and for the following text in said text stream immediately after the selected location;
   altering said text stream by inserting or deleting said block of selected text;
   comparing the character set for the preceding text, the following text and the selected text to be inserted or deleted; and
   inserting character set change codes in the altered text stream when said comparison indicates a character set mismatch.

2. In a text processing system where a text stream is stored and different characters sets are selectable for insertion within the text stream, a method for altering the text stream comprising the steps of:

displaying said text stream to an operator;
   in response to an operator command, identifying a location in said text stream for inserting a block of selected text;
   determining the character set for the preceding text in said text stream immediately before the identified location and for the following text in said text stream immediately after the identified location;
   determining the character set for the starting text and ending text of the block of selected text to be inserted;
   comparing the character set for the preceding text with the starting text for a character set mismatch;
   inserting a character set change code in said text stream between said prededing text and said starting text when the comparison indicates a character set mismatch between the character set for said starting text and said preceding text;
   inserting said block of selected text at said location;
   comparing the character set for the following text with the ending text for a character set mismatch; and
   inserting a character set change code in said text stream between said ending text and said following text when the comparison indicates a character set mismatch between the character set for said following text and said ending text.

3. In a text processing system where a text stream is stored and different character sets are selectable for deletion from the text stream, a method for altering said text stream, comprising the steps of:

displaying said text stream to an operator;
   in response to an operator command, identifying a block of text stream for deletion from said text stream;
   determining the character set for the preceding text immediately before the block of text stream and for the following text immediately after the block of text stream;
   deleting the block of text stream;
   comparing the character set of the text preceding the deleted block of text with the character set following the block of text for a character set mismatch; and
   inserting a character set change code after said preceding text and before said following text when the two texts do not compare to indicate the character set of said following text differs from the character set for said preceding text.

4. In a text procesing system having a stored text stream where different character sets are selectable for insertion or deletion within the text stream, a method for altering said text stream, comprising the steps of:

identifying a block of text to be inserted into the text stream at an operator selected location;
   determining the character set for the preceding text in the text stream immediately before the operator selected location;

determining the character set for the starting text of the block of inserted text;

comparing the text preceding the point of insertion in the text stream and the starting text of the block of inserted text;

inserting a character set change code in said text stream between said preceding text and the starting text when the comparison indicates a character set mismatch between the character set for the starting text and said preceding text; and inserting said block of said selected text at the operator selected location.

5. A text processing system as set forth in claim 4 including the step of designating the location for inserting the block of selected text.

6. In a text processing system as set forth in claim 5 including the step of:

determining the character set for the following text in the text stream immediately after the identified location;

comparing the character set for the following text with the ending text of the block of inserted text; and inserting a character set change code in the text stream between the ending text and the following text when the comparison indicates a character set mismatch between the character sets for the following text and said ending text.

7. In a text processing system having a stored text stream where different character sets are selectable for deletion from the text stream, a method for altering the text stream, comprising the steps of:

determining the character set for the preceding text immediately before a block of text stream to be deleted and also the character set for the following text immediately after the block of text stream;

deleting the block of text stream;

comparing the character set for the preceding text with the character set for the following text to identify a character set mismatch; and inserting a character set change code after said preceding text and before said following text when the two texts do not compare to indicate the character set of said following text differs from the character set for the preceding text.

8. In a text processing system as set forth in claim 7 including the step of specifying a block of text to be deleted from the text stream.

* * * * *